United States Patent
Ohshima et al.

(10) Patent No.: US 8,845,091 B2
(45) Date of Patent: Sep. 30, 2014

(54) VARIABLE PRINTING MEDIUM HAVING HIGH GLOSSINESS, AND RECORDING METHOD

(75) Inventors: Tohru Ohshima, Kanagawa (JP); Michihiko Namba, Kanagawa (JP); Kiyofumi Nagai, Tokyo (JP); Atsushi Hasegawa, Niigata (JP); Shuichi Oguma, Niigata (JP); Hisanori Sakatsume, Niigata (JP)

(73) Assignees: Ricoh Company, Ltd., Tokyo (JP); Hokuetsu Kishu Paper Co., Ltd., Nagaoka-shi (JP)

(*) Notice: Subject to any disclaimer, the term of this patent is extended or adjusted under 35 U.S.C. 154(b) by 355 days.

(21) Appl. No.: 13/257,140

(22) PCT Filed: Mar. 17, 2010

(86) PCT No.: PCT/JP2010/055142
§ 371 (c)(1),
(2), (4) Date: Sep. 16, 2011

(87) PCT Pub. No.: WO2010/107128
PCT Pub. Date: Sep. 23, 2010

(65) Prior Publication Data
US 2012/0001981 A1 Jan. 5, 2012

(30) Foreign Application Priority Data
Mar. 18, 2009 (JP) ................. 2009-065516

(51) Int. Cl.
*B41J 2/01* (2006.01)
*B41M 5/52* (2006.01)
*B41M 5/50* (2006.01)
*C09D 7/12* (2006.01)
*C09D 11/38* (2014.01)
*C08K 3/34* (2006.01)
*C08K 3/36* (2006.01)

(52) U.S. Cl.
CPC ............. *B41M 5/5218* (2013.01); *B41J 2/01* (2013.01); *B41M 5/502* (2013.01); *C08K 3/346* (2013.01); *C08K 3/36* (2013.01); *C09D 7/1216* (2013.01); *C09D 11/38* (2013.01)
USPC ............................ 347/105; 347/101; 347/100

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41M 5/0011; B41M 5/0017; B41M 7/00; C09D 11/36; C09D 11/40; C09D 11/30; C09D 11/38; C09D 11/322; C09D 11/328; C09D 11/101; C09D 11/005; C09D 11/54; C09D 11/52
USPC ........... 347/100, 95, 96, 105, 103, 101, 20, 9; 428/195, 32.1
See application file for complete search history.

(56) References Cited

U.S. PATENT DOCUMENTS

| | | | |
|---|---|---|---|
| 5,431,720 A | 7/1995 | Nagai et al. | |
| 5,462,592 A | 10/1995 | Murakami et al. | |
| 5,514,208 A | 5/1996 | Nagai et al. | |
| 5,576,088 A * | 11/1996 | Ogawa et al. ................. | 347/105 |
| 5,622,550 A | 4/1997 | Konishi et al. | |
| 5,810,915 A | 9/1998 | Nagai et al. | |
| 5,879,439 A | 3/1999 | Nagai et al. | |
| 5,882,390 A | 3/1999 | Nagai et al. | |
| 5,972,082 A | 10/1999 | Koyano et al. | |
| 5,993,524 A | 11/1999 | Nagai et al. | |
| 6,120,589 A | 9/2000 | Bannai et al. | |
| 6,231,652 B1 | 5/2001 | Koyano et al. | |
| 6,261,349 B1 | 7/2001 | Nagai et al. | |
| 6,613,136 B1 | 9/2003 | Arita et al. | |
| 6,637,875 B2 | 10/2003 | Kaneko et al. | |
| 6,670,002 B1 * | 12/2003 | Sekiguchi et al. ......... | 428/32.34 |
| 6,688,737 B2 | 2/2004 | Nagai et al. | |
| 6,695,443 B2 | 2/2004 | Arita et al. | |
| 6,730,149 B2 | 5/2004 | Arita et al. | |
| 6,730,155 B2 | 5/2004 | Gotoh et al. | |
| 6,786,588 B2 | 9/2004 | Koyano et al. | |
| 6,899,751 B2 | 5/2005 | Arita et al. | |
| 6,918,662 B2 | 7/2005 | Arita et al. | |
| 7,033,013 B2 | 4/2006 | Koyano et al. | |
| 7,094,813 B2 | 8/2006 | Namba et al. | |
| 7,278,726 B2 | 10/2007 | Nagai | |
| 7,284,851 B2 | 10/2007 | Bannai et al. | |
| 7,370,952 B2 | 5/2008 | Inoue et al. | |
| 7,374,608 B2 | 5/2008 | Arita et al. | |
| 7,682,011 B2 | 3/2010 | Namba et al. | |
| 7,699,457 B2 | 4/2010 | Namba et al. | |
| 7,810,919 B2 | 10/2010 | Kojima et al. | |
| 7,812,068 B2 | 10/2010 | Habashi et al. | |
| 7,919,544 B2 | 4/2011 | Matsuyama et al. | |
| 7,938,527 B2 | 5/2011 | Ohshima et al. | |

(Continued)

FOREIGN PATENT DOCUMENTS

CN 1577116 A 2/2005
CN 101142287 A 3/2008

(Continued)

OTHER PUBLICATIONS

Chinese Office Action issued May 3, 2013, in China Patent Application No. 201080021735.2 (with English Translation).
Japanese Office Action issued Sep. 6, 2012, in Patent Application No. 2009-065516.
International Search Report issued Apr. 27, 2010 in PCT/JP10/055142 filed Mar. 17, 2010.

(Continued)

*Primary Examiner* — Manish S Shah
(74) *Attorney, Agent, or Firm* — Oblon, Spivak, McClelland, Maier & Neustadt, L.L.P.

(57) ABSTRACT

A printing medium including at least base paper and a coating layer, wherein the coating layer is directly formed on the base paper by a cast coating method using a coating liquid, which contains kaolin and amorphous silica and contains the amorphous silica in an amount of 3% by mass to 20% by mass.

10 Claims, No Drawings

(56) References Cited

U.S. PATENT DOCUMENTS

| | | |
|---|---|---|
| 7,950,793 B2 | 5/2011 | Aruga et al. |
| 8,029,122 B2 | 10/2011 | Kojima et al. |
| 8,109,622 B2 | 2/2012 | Goto et al. |
| 2004/0261964 A1* | 12/2004 | Asano et al. ............... 428/32.1 |
| 2005/0020448 A1 | 1/2005 | Tamagawa et al. |
| 2006/0176349 A1 | 8/2006 | Nagai et al. |
| 2007/0197685 A1 | 8/2007 | Aruga et al. |
| 2008/0047677 A1 | 2/2008 | Tamagawa et al. |
| 2008/0273045 A1 | 11/2008 | Morohoshi et al. |
| 2008/0302268 A1 | 12/2008 | Arita et al. |
| 2009/0098312 A1* | 4/2009 | Goto et al. ................. 427/595 |
| 2009/0114121 A1 | 5/2009 | Morohoshi et al. |
| 2009/0130313 A1 | 5/2009 | Ohshima et al. |
| 2009/0162569 A1 | 6/2009 | Morohoshi et al. |
| 2009/0176070 A1 | 7/2009 | Goto et al. |
| 2009/0186162 A1 | 7/2009 | Namba et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |
| 2009/0291213 A1 | 11/2009 | Ohshima et al. |
| 2010/0028571 A1* | 2/2010 | Schultz et al. .............. 347/106 |
| 2010/0194837 A1* | 8/2010 | Ohshima et al. ............ 347/102 |
| 2010/0196601 A1 | 8/2010 | Goto et al. |
| 2010/0196673 A1 | 8/2010 | Nagashima et al. |
| 2010/0245416 A1 | 9/2010 | Ohshima et al. |

FOREIGN PATENT DOCUMENTS

| | | |
|---|---|---|
| CN | 101360799 A | 2/2009 |
| EP | 1 500 746 | 1/2005 |
| JP | 2005 239799 | 9/1993 |
| JP | 6 320857 | 11/1994 |
| JP | 11 48604 | 2/1999 |
| JP | 11 78225 | 3/1999 |
| JP | 2004 84141 | 3/2004 |
| JP | 2005-43474 | 2/2005 |
| JP | 2005 212327 | 8/2005 |
| JP | 2005 271522 | 10/2005 |
| JP | 2005 288700 | 10/2005 |
| JP | 2007 144975 | 6/2007 |
| JP | 2007-270143 | 10/2007 |
| JP | 2009 12247 | 1/2009 |
| JP | 2009 220529 | 10/2009 |
| WO | WO 2007/072951 A1 | 6/2007 |
| WO | 2007 105806 | 9/2007 |

OTHER PUBLICATIONS

Combined Office Action and Search Report issued Dec. 10, 2013 in Chinese Patent Application No. 201080021735.2 with English language translation and English translation of categories of cited documents.

* cited by examiner

VARIABLE PRINTING MEDIUM HAVING HIGH GLOSSINESS, AND RECORDING METHOD

TECHNICAL FIELD

The present invention relates to a recording medium which can achieve a high quality image and a high quality tone as excellent as those of a silver halide photograph at a low cost by an inkjet method and can be further used in offset printing and electrophotography, an ink medium set, and an inkjet recording method using these, as well as to ink recorded matter.

BACKGROUND ART

Inkjet (IJ) recording technologies have met with developments of general technologies, including various peripheral technologies; such as hardware such as inkjet heads, and printer systems; supplies such as ink media; and controlling methods for controlling image treatment, and other systems, and thereby achieve high quality images which may be superior to those of a silver halide photograph at present, and are established as IJ printing technologies. The IJ printing technologies using aqueous inks and porous media are widely used among general consumers because of their handiness, as disclosed particularly in Patent Literatures (PTLs) 1 and 2, and are in the recent years used such that the silver halide photographic method may be replaced by the IJ printing technologies. Accordingly, these IJ technologies are increasingly used in the field of printing industries. There are generally two applications of the IJ technologies in the printing industries at present.

One of the applications is in so-called "horizontally developed" technologies which are widely used among general consumers. This is an application where a small amount of high quality images is printed on IJ media, regular paper, and the like, and the application is represented by use of a proof machine using a wide format printer and use for forming signs. The IJ printing technologies have met with a great success with respect to this application and a very large market for this application has been already established.

The other of the application, which especially attracts attention recently, is an application in so-called variable printing which is capable of printing at very high speed, though which does not require a press plate. So far, the application of the IJ printing technologies in such variable printing has been studied and put into practical use since a long time ago as disclosed in, for example, PTLs 3 and 4, and is so far mostly applications in the field in which relatively high image quality is not required, such as in the field in which mainly letters and rules are printed, such as for fee specifications, issued invoices, and address printing.

That is, for example, PTL 3 discloses an inkjet recording sheet having an offset printing layer on one side of base paper, and an inkjet recording coat layer on the other side, wherein the base paper is subjected to surface coating and size press treatment with a size press liquid containing, for main components, 0.5 g/m² to 3.0 g/m² of an aqueous polymer resin (a cation resin described below or a normal starch-based size agent capable of preventing elution of an aqueous polyvalent metal salt), 0.1 g/m² to 2.0 g/m² of a cation resin (for improving water resistance of a dye ink and print density of a pigment ink), and 0.1 g/m² to 2.0 g/m² of an aqueous polyvalent metal salt chelating agent (for improving ink absorption and preventing neighboring ink spots having different colors from bleeding and overlapping); and thereby improving ink absorption and at the same time keeping a sizing degree of the base paper low in inkjet recording on one side; and thereby preventing degradation of print resistance with an excessive absorption of dampening water at the time of offset printing on the reverse side, at the same time preventing exuding of inks at the time of writing on the reverse side with a fountain pen or an aqueous ink pen, and preventing degradation of offset printing or print resistance in printing on the reverse side of the base paper which degradation is due to elution of a cationic material used for improving water resistance of a dye ink or improving print density of a pigment ink in offset printing. However, this base paper does not have an ink absorption layer produced by a cast coating method, thus, cannot achieve a glossy inkjet record. In addition, this invention has two types of printing surface, that is, an offset printing surface and an inkjet recording surface each on one side of the paper, and this invention does not described an application in electrophotography.

PTL 4 discloses printing coated paper having on a surface of base paper a first coat composed of 1.0 g/m² to 2.0 g/m² of a cationic material (an alkylamine/ammonia/epichlorohydrine polycondensate which has a molecular weight of 20,000 or less and is capable of reacting with an anionic site of inks of an inkjet aqueous ink which contain a direct dye or an acid dye), and a second coat produced on the first coat with a coating liquid containing a SBR latex binder, which does not contain an aqueous resin but contains 20% by mass or more of an acrylonitrile component portion, and 30% by mass or more of light calcium carbonate as a pigment, wherein the coated layers are super-calendered such that an on-demand inkjet print part can be formed on blank space of an offset print part as required. However, also this coated paper does not contain an ink absorbing layer produced by a cast coating method, thus, cannot achieve a glossy inkjet record. In addition, an application in electrophotography is not mentioned in this patent application.

PTL 5 discloses an inkjet recording medium having a normal undercoat layer which is on a substrate, and an ink absorbing layer produced by a cast coating method (a glazed finish of the coat surface produced with a heated mirror drum) on the under coat layer, wherein the ink absorbing layer is formed with a coating liquid, and the coating liquid contains a precipitated silica, which has a relatively low BET specific surface area(81 m²/g to 200 m²/g), a relatively low oil absorption amount (144 ml/100 g to 200 ml/100 g), and a particle diameter not excessively small (particle diameter: 1.3 μm to 2.3 μm), and which is selected from silica pigments that have hiding power stronger than those of other body pigments, have a transparent appearance, a high BET specific area, and a large oil absorption amount, thus, have excellent ink absorption and color developing ability, with the precipitated silica being added into the coating liquid in an amount of 60% by mass to 80% by mass of the under coat layer, and contains a binding agent which is incorporated in the coating liquid in a semi moist state immediately after production in an amount of 3% by mass to 50% by mass per 100 parts by mass of the total pigment, thereby the binding agent preventing secondary aggregation caused by its high activity in the coating liquid and avoiding excessively high viscosity of the coating liquid, and wherein the ink absorbing layer is made uniform thereby.

However, this inkjet recording medium has an undercoat layer and indirectly achieves high ink absorption using the silica body pigment, making it difficult to produce color images having deeply toned colors that can be produced by an adequate penetration of the ink in the depth direction into the ink coated layer.

These originate from weak points intrinsic to the IJ technologies.

In addition to the above Patent Literatures, PTL 6 discloses offset paper having a coated layer casted according to a casting method using an aqueous coating liquid containing, at the time of preparing the coating liquid, 3% by mass to 30% by mass of a body pigment that does not have a high oil absorption amount measured according to JISK-5101 (oil absorption amount thereof: 70 ml/100 g to 280 ml/100 g) as a pigment excellent in dispersibility (such as white carbon, diatomaceous earth, calcined diatomaceous earth, calcined clay, flux calcined diatomaceous earth, fine particulate anhydrous aluminum hydroxide, fine particulate titanium oxide, fine particulate anhydrous silica, magnesium carbonate), and 3% by mass to 30% by mass of a styrene-butadiene-methyl methacrylate terpolymer latex which is produced by copolymerizing a methyl methacrylate component in a mass ratio of the methyl methacrylate component to a styrene-butadiene copolymer portion of 10% by mass to 40% by mass in the styrene-butadiene copolymer which is characterized in its excellent adhesion strength and hardness of a film thereof. According to this Patent Literature, this technology can prevent ink piling at the time of offset rotary printing system using a polychromatic printing system (a phenomenon in which ink deposited on a paper surface with the first trunk of a blanket is reverse transferred onto the second or later trunk of the blanket, thereby reducing image density of the printed matter in a corresponding manner, or in the severe case, making the ink piled up and making the reverse transferred ink retransferred onto printed matter to produce contamination) because of the existence of a methyl methacrylate component in the ink absorbing layer. Use of the inkjet printing method is not considered in this technology, and no electrophotograqphical application of the invention of this patent application is described in this patent application.

Most of the present IJ technologies are those in which drops of a low-solid-content ink are ejected from a head, attached in a liquid state on a medium, and then dried and solidified according to some method. IJ technologies for general consumers or wide format IJ technologies depend on ink absorption of a medium for most part of the ink drying. It is very difficult to realize both of the ink drying and high speed printing in a balanced manner, without using IJ media or regular paper.

Especially in the field of variable printing among the fields of these industries, expensive IJ paper which is preferable for general consumer's use or for use in some proof machines has not been used very much because of very hard limitations on the use of this product set by factors of productivity and printing cost. Therefore, as a result of making ink drying ability and costs first priority, only regular paper has been available in the field of variable printing so far. Especially for printing in which high quality glossy images are desired, such as for printing high-grade catalogs, fancy boxes, magazine covers, or direct mails, only realistic measures for using high-speed inkjet printing have been using very expensive media. On the other hand, when cheap regular paper is used, it is difficult to produce high quality images because that ink dots spread on the paper and that the ink penetrates the paper so severely that high density images are not reproducible. When so-called "IJ printers for general consumers" are used and images are printed at high speed, it is impossible to reproduce, at a low cost, high quality printed matter such as those printed on IJ glossy paper.

While the IJ method and IJ glossy paper begin to be partly used in minilab for industrial purpose, from the view point of difficulty in use the practical use of the above medium is for use in DPE where consumers may purchase the printed matter printed on the above medium in spite of a relatively high unit cost of printing, at present, because of a still high price of the above medium. Therefore, at present, in order to practically use these IJ photoprinting methods in industrial fields, it is necessary to reduce the cost of the above medium in some way.

IJ media mainly for expected photographical use such as those mentioned above are, at present, mainly classified into RC glossy paper produced by laminating absorbing layers on resin coat (RC) paper as base paper, and IJ cast coated paper which uses, as base paper, high quality paper or coat paper surface layer of which is mirrored according to a cast coating method. The IJ cast coated paper, which uses cheaper base paper and achieves higher production efficiency than the RC glossy paper than the RC glossy paper, can be produced to some extent at a lower cost than the RC glossy paper, however, needs to be equipped with an ink absorbing layer using raw materials for IJ cast coated paper so as to achieve both excellent ink absorption and high glossiness, and thus is inadequate for use in usual commercial printing because of a still-high cost thereof.

In addition, it is known that when offset printing or electrophotographic printing is performed with respect to these IJ media, various problems are known to occur. In the case of offset printing, an acid component contained in the IJ media is well known to disadvantageously cause contamination of blocks and poor ink fixation. In the case of electrophotographic printing, the media is well known to fuse in the heater configured to fix toner and, thereby, cause machine failure.

Also conventional IJ media themselves may cause, because of the limitations on materials which can be used in the ink absorbing layer, powder down at the time of media cut and cracking of a coat film at the time of paper folding in bookbinding, and thus they can be said to have been media difficult to use in the industrial fields.

Accordingly, IJ glossy paper is rarely used in large amounts for industrial purposes at present.

On the other hand, the above-mentioned cast coating paper is representative glazed paper that is used in large amounts in printing industries and is used in general offset printing, and the like. However, the above-mentioned cast coating paper for offset printing is not equipped with an absorbing layer for absorbing an ink, which is different from the cast coating paper for IJ printing, and could not be used for IJ printing application. When images are inkjet printed on normal commercial printing coat paper, the ink absorption and wettability of the resulting printed matter are degraded, and the images spread and the printed matter becomes difficult to dry, making the use of the normal commercial printing coat paper for inkjet printing impractical.

A printing medium which can be used in every printing method is desired in the variable printing. When the variable printing is used, it becomes possible to offset print a basic area in the pages, which is not required to be offset printed, in large number at a low cost, and to print other area in the pages according to at least one of an electrophotographic method or an inkjet method. Also from the viewpoint of reduction of productive/economical risk of insufficient selection of the similar types of goods which are produced by a media maker for different printing method the goods use, a mighty medium which can be used in various printing methods is desired.

However, there have been no medium that can be used in all of electrophotography, offset printing, and inkjet printing, except regular paper.

Particularly, it has been considered technically very difficult to produce, at a low cost, a medium that can be used in all the printing methods and can produce glazed surfaces. Because the realization of such media will dramatically widen the range of applications of the variable printing, such media has been strongly desired.

The present inventors tested an inkjet recording method that can reproduce, at a low cost, texture of the recorded matter similar to those of silver halide photographs, so as to use the inkjet recording method using an aqueous pigment in commercial printing, particularly, in photographic image quality printing in which high quality images are desired.

The present invention discloses an example in which a pigment ink having high penetration ability, such as those described in PTL 7, is used in combination with a medium having a low ink absorption, which is in contrast to the conventional media, to realize an image forming method that can be used at a low cost on commercial printing paper, and the like. It becomes possible, by this method, to inkjet print even on such low-ink-absorption paper as commercial printing paper or publication printing paper which has been considered inappropriate for inkjet printing.

However, it has been difficult to print a quality photograph having a glazed surface at a practical speed in variable printing even when this method is used. The cast coating paper has excessively poor ink absorption among many types of commercial printing paper, exuding images when images are printed at a high speed, producing image degradation that can not be neglected when high quality photographic images are reproduced, making the use of the cast coating paper impractical.

Furthermore, regarding coated layers on the base paper, the present inventors have, so far, proposed an inkjet recording method (PTL 8) including at least printing on a recording medium with an aqueous ink, wherein the recording medium is composed of a support containing cellulose pulp as a main component, and one or more of coated layer is deposited on at least one side of the support, the coated layer contains a pigment and an adhesive, the amount of cationic additives in the total amount of materials forming the coated layer is 0.1% by mass or less, the 60° glossiness of the most outer layer of the recording medium as defined in JIS-ZS-8741 is 13 or less and the cut off value of the most outer layer of the recording medium is 0.8 μm, and wherein the aqueous ink contains at least particulate color material, resin emulsion, water, and a moistening agent, and the solid content of the aqueous ink is 3% by mass or more. However, it is necessary to investigate compatibility of the coated layer with the base paper supporting the coated layer in addition to the coated layer.

CITATION LIST

Patent Literature

PTL 1: Japanese Patent Application Laid-Open (JP-A) No. 2005-212327
PTL 2: JP-A No. 11-078225
PTL 3: JP-A No. 2005-271522
PTL 4: JP-A No. 2004-84141
PTL 5: JP-A No. 2005-288700
PTL 6: JP-A No. 05-239799
PTL 7: JP-A No. 2007-144975
PTL 8: JP-A No. 2009-220529

SUMMARY OF INVENTION

In view of the above proposal, the present invention has been carried out in order to achieve the following objects. An object of the present invention is, according to a cast coated medium, ink, and recording method shown in the present invention, to provide printed matter which is cheap, has favorable print quality, has handling similar to regular inkjet paper, and glossiness comparable to silver halide photograph, easily, and at high speed.

Further, another object is to provide an ideal inkjet media for an aqueous pigment ink which may be usable as commercial printing paper itself because they can be used in offset printing and electrophotography, an aqueous pigment ink optimized for use in the media, and an inkjet recording method.

The above objects are achieved by the following measures.

<1> A printing medium including at least base paper and a coating layer, wherein the coating layer is directly formed on the base paper by a cast coating method using a coating liquid, which contains kaolin and amorphous silica and contains the amorphous silica in an amount of 3% by mass to 20% by mass. The cast coating method may include, as a drum transferring method, a direct method, an aggregation method, and a remoistening method as well as a film transferring method. All of these cast coating methods can be used in cast coating, however, a remoistening method is preferable from the view point of productivity.

<2> The printing medium according to <1>, wherein the amorphous silica is such that a dispersion having 5% by mass of the amorphous silica has a pH of 6 or higher.

<3> An inkjet recording method including at least printing an image on the printing medium according to one of <1> and <2> with an ink which contains a fluorine surfactant and has a surface tension of 15 mN/m to 30 mN/m.

<4> The inkjet recording method according to <3>, wherein the fluorine surfactant is represented by the following Structural Formula (1):

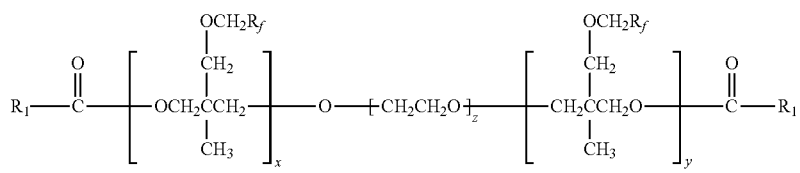

Structural Formula (1)

wherein in the above Structural Formula (1), $R_1$ represents any one of a hydrogen atom, an alkyl group, and a fluorine containing group; $R_f$ represents a fluorine containing group; and x, y, and z each represent an integer.

<5> The inkjet recording method according to <4>, wherein the ink contains a water dispersible resin.

<6> An image forming method including at least forming an image on the printing medium according to <1> by using at least one of an offset printing method and an electrophotographic printing method in combination with an inkjet printing method.

According to the present invention, an inkjet recording method which produces excellent printing quality and achieves high-speed and low-cost printing can be used in combination with media which have a glazed surface and which can be used in various printing methods, the combined use thereof has been considered difficult to achieve.

DESCRIPTION OF EMBODIMENTS (Printing Media)

A medium according to the present invention can be used in both offset printing and electrophotography, in addition to in inkjet printing, and has a characteristic material composition of the coated layer such that the production cost can be reduced. Furthermore, the inkjet ink used in combination with this medium is an ink containing particulate color material that has high penetration ability suitable for this media. When not only the medium is optimized, but also the ink used in combination with this medium is optimized for this medium, it becomes possible to realize a medium which can be used in almost all the principal printing methods available at present.

<Base Paper>

Base paper used in the present invention is not particularly limited, as long as it is paper composed of plant fiber, and is preferably high quality paper in which preferably at least the side of the paper to be coated with a coating liquid is sized and pressed. This is so, because that when the base paper has not been sized, a coating liquid tends to penetrate nonuniformly into the paper at the time when a cast coating layer (a coating layer) is laminated on the base paper, making stable mirror surface formation difficult.

On the other hand, when electrophotographic printing is carried out using a medium having low air permeability or no air permeability, such as RC base paper used in silver halide photography, problems tend to occur. In the electrophotographic method, most of the methods for fixing toner are methods of nipping paper with a heated roller to fuse the toner. In this case, moisture contained in the paper is heated and swells as water vapor. In the case of the RC paper, this water vapor may not be smoothly discharged from the paper and may foam in the base paper.

The pulp composition or the beating conditions used in the base paper is not particularly limited, may be selected from conventional ones, and examples thereof include virgin chemical pulp (CP) which is obtained by chemically treating wood and its fibrous material, such as a virgin chemical pulp, a bleached hardwood kraft pulp, a bleached softwood kraft pulp, an unbleached hard wood kraft pulp, an unbleached soft wood kraft pulp, a bleached hard wood sulfite pulp, a bleached softwood sulfite pulp, an unbleached hardwood sulfite pulp, an unbleached softwood sulfite pulp, and the like; and virgin mechanical pulp (MP) which is obtained by mechanically treating wood and its fibrous material, such as a ground pulp, a chemi-ground pulp, a chemi-mechanical pulp, a semi-chemical pulp, and the like. The recycle pulp can also be used in the support, and raw materials of the recycle pulp are, for example, paper defined as terms of "high white", "line white", "cream white card", "special white", "mild white", "imitation", "pale", "Kent", "white art", "special high cut", "separate high cut", "news paper", "magazine", and the like in Standard Chart of Recycled Paper, produced by Paper Recycling Promotion Center that is Japanese non-profit foundation (the above-mentioned definitions can be found in the chart).

The internal additives used in the base paper are, for example, calcium carbonates such as light calcium carbonate and heavy calcium carbonate. These may be used in combination with a conventionally known white pigment. Examples of the white pigments include inorganic white pigments such as kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate and magnesium hydroxide; organic pigments such as styrene plastic pigment, acrylic plastic pigment, polyethylene, microcapsule, urea resin and melamine resin. These may be used alone or in combination.

The internally adding sizing agent used in the base paper is not particularly limited and may be suitably selected from conventional internally adding sizing agents used for high quality paper. Suitable internally adding sizing agents are, for example, a rosin sizing agent.

The amount of the internally adding sizing agent is 0.1 parts by mass to 0.7 parts by mass relative to 100 parts by mass of bone-dry pulp, but it is not limited thereto.

Surface sizing agent used in the present invention is not particularly limited, as long as it can provide an effect of sizing, and may be suitably selected from those used for regular acid-free high quality paper, considering the compatibility with the internally adding pigment. Specific examples thereof include an aqueous solution of a styrene-acrylate copolymer, a styrene-methacrylate copolymer, a styrene-maleate copolymer, and an olefin-maleate copolymer.

These surface sizing agents may be used alone for application onto paper, however, it is desirable to mix these surface sizing agents with other components such as starch, modified starch, and an inorganic salt to prepare a coating liquid for application onto paper.

Methods for applying these surface sizing agent are not particularly limited, and are preferably a method including impregnating and attaching these surface sizing agents with a size press provided in a paper machine, such as a conventional size press, a gate roll size press, or a film transfer size press, and finishing with an oil machine, from the viewpoint of cost.

In addition to the above-mentioned agents, raw materials generally used in base paper making, such as paper strength additives, pH adjusters, and various surfactants may be suitably used depending on the purpose.

<Cast Coating Layer>

An ink absorbing layer is not necessarily provided on a printing medium, which is different from regular inkjet cast coating paper. In the printing medium, a cast coating layer instead of an IJ absorbing layer may be formed on a surface of the base paper in the same manner as in so-called commercial printing cast coating paper.

A coating liquid for forming the above-mentioned cast coating layer may be different from conventional inkjet cast coating paper or conventional commercial printing coating paper. Main components of the coating liquid are a pigment, an adhesive, and a releasing agent.

Specific description of the components contained in the aqueous coating composition is as follows.

—Pigment—

The pigments essential for the cast coating layer of the medium of the present invention are kaolin and amorphous silica. When one of the essential pigment components is absent, it becomes difficult to use the medium in various printing methods, wherein the capability of using the medium in various printing methods is a characteristic of the medium of the present invention.

Kaolin includes first-grade kaolin, second-grade kaolin, and third-grade kaolin, as well as calcined kaolin.

It is necessary to precisely control the amount of amorphous silica such that the amount of amorphous silica is 3% by mass to 20% by mass in the total solid content of the coating layer. When the amount of amorphous silica is less than 3%, the resulting medium cannot be used in inkjet printing. When the amount of amorphous silica is more than 20%, resistance to color change (dry down) caused by ink penetration into the medium at the time of offset printing is degraded, surface glossiness of the medium is reduced even when the cast coating has been performed in a production process, and powder down or cracking of the coating layer may occur at the time of cutting of a medium and folding paper in processing and book binding.

In addition, amorphous silica used in the present invention preferably has an average particle diameter of 2 μm to 7 μm. When the average particle diameter of amorphous silica is 2 μm or less, ink absorption is degraded. When the average particle diameter of amorphous silica is 7 μm. or more, glossiness is degraded.

In addition, the amorphous silica used in the present invention preferably produces a 5%-by-mass dispersion having a pH of 6 or higher.

When the pH of the 5%-by-mass dispersion is less than 6, in addition to exfoliation of the coating layer due to ink tacking (piling) at the time of offset printing, and abnormal increase in viscosity of the coating liquid at the time of preparing coating liquid may occur.

The particle diameter of Kaolin used in the present invention is not particularly limited, and Kaolin of which 96%, 92%, or 82% of the particles have a particle diameter of 2 μm or less can be suitably used.

For other pigments, white pigments may be used which can be used in conventional printing cast coating paper depending on the purpose. For other pigments, from the viewpoint of whiteness, cost, and usability in offset printing, especially common coated paper pigment, such as light calcium carbonate, zinc oxide, clay, aluminum hydroxide, calcium carbonate, titanium dioxide, barium sulfate, satin white, and plastic pigment may be used for other pigment. These may be used alone or in combination. Examples of the plastic pigment include an aqueous dispersion of styrene-acrylate copolymer particles, styrene-butadiene copolymer particles, polystyrene particles, and polyethylene particles. Two or more types of these organic pigments may be mixed for use.

The shapes of the organic pigments may be a compact solid type, a hollow type, or a doughnut type, however, are preferably particles having an average particle diameter of 0.2 μm to 3.0 μm, more preferably a hollow type having a void ratio of 40% or more, in view of the glossiness, surface covering ability, and balance of flow ability of the coating liquid.

Furthermore, when pigments satisfy the above conditions, other inorganic pigments or other organic pigments can be used as required. Examples of the inorganic pigments include talc, calcium sulfite, titanium white, magnesium carbonate, titanium dioxide, aluminum hydroxide, calcium hydroxide, magnesium hydroxide, zinc hydroxide, and chlorite.

—Adhesive—

The adhesive is one or more selected from common coating paper adhesives such as casein, soy proteins, synthetic proteins; conjugate diene polymer latex such as styrene-butadiene copolymers and methyl methacrylate-butadiene copolymers; acrylic polymer latex such as polymers or copolymers of at least one of acrylic acid ester and methacrylic acid ester; vinyl copolymer latex such as ethylene-vinyl acetate copolymers; or an alkali soluble or alkali insoluble polymer latex which is produced by modifying the above-mentioned various copolymer latex with a monomer containing a functional group such as a carboxyl group; synthetic resin adhesives such as polyvinyl alcohols, olefin/maleic anhydride resins, and melamine resins; starch such as oxidized starch, esterified starch, enzyme-modified starch, and cationized starch; cellulose derivatives such as carboxymethyl cellulose, and hydroxyethyl cellulose. These adhesives are mixed with a pigment in a mixing ratio of 10 parts by mass to 70 parts by mass of the adhesive to 100 parts by mass of the pigment.

The adhesive must be an emulsion of an aqueous resin which has a strong binding ability to a pigment constituting the cast coating layer and to base paper, does not cause blocking, and further have an excellent matching ability to an ink used in a commercial printing paper. In particular, in order to prevent the piling or tinting which tends to cause printing problems, it is desirable to incorporate starch used in general printing paper, or styrene-butadiene (SBR) latex which is seldom used in inkjet paper in addition to modified starch. When the SBR latex, of which compatibility with a cationic agent as an inkjet ink fixing agent is poor, is incorporated into an inkjet medium, usually, the surface of the inkjet medium becomes hydrophobic, and wettability of the inkjet ink is degraded, therefore, the SBR latex is seldom used in inkjet paper, however, is required so as to increase the usability of the medium in offset printing.

The styrene-butadiene latex may be a copolymer latex which contains styrene and butadiene as monomers, may be copolymerized with other monomer as required, may be a modified copolymer produced by a chemical reaction, and may be generally used for paper coating. Examples of other monomer frequently used include vinyl monomers such as acrylic acid, methacrylic acid, alkyl ester of acrylic acid or methacrylic acid, acrylonitrile, maleic acid, fumaric acid, and vinyl acetate. Further, the styrene-butadiene latex may contain a cross-linking agent such as methylolized melamine, methylolized urea, methylolized hydroxy propylene urea, and isocyanate, or may be a self-crosslinkable copolymer containing a unit such as N-methylol acrylamide. These may be used alone or in combination.

The dried adhesion amount of the cast coating layer (coating layer) is preferably 6 $g/m^2$ or more, and more preferably 10 $g/m^2$ or more. When the dried adhesion amount of the cast coating layer is less than 6 $g/m^2$, the glossiness of the coating film is degraded, uneven glossiness according to the position in the cast coating film caused by unevenness of the base paper may occur. When the dried adhesion amount of the cast coating layer is more than 10 $g/m^2$, almost stable glossiness may be obtained. The larger the dried adhesion amount is, the easier the glossiness of the cast coating layer and the texture of the surface can be increased. However, when the dried adhesion amount of the cast coating layer is excessively large, speed of ink absorption into the base paper is reduced at the time of inkjet printing, and images may spread to some extent and the drying period may be extended. Accordingly, the dried adhesion amount of the cast coating layer is preferably 30 $g/m^2$ or less.

When the drying period of the cast coating layer (coating layer) is long in the production process of the medium, material costs may increase to lower the productivity of the medium.

The basis weight of the recording medium of the present invention is preferably 50 $g/m^2$ to 250 $g/m^2$. When it is less than 50 $g/m^2$, the stiffness is insufficient and conveying defects easily occur, for example, the conveying path can be clogged with the recording medium. When the basis weight of recording medium is more than 250 $g/m^2$, the stiffness is too high and the recording medium is not bent in the curved portions of the conveying path, thereby causing conveying defects such as clogging of the conveying path with the recording medium.

(Inkjet Recording Method)

The inkjet recording method of the present invention is realized by using the medium of the present invention in combination with the ink. Although the effect of the invention may be obtained by using one of the ink and the medium, the highest effect may be obtained by using the ink in combination with the medium. That is, when the medium is used in combination with the inkjet ink of the present invention, high image density and images having no spread may be obtained.

<Ink>

The ink of the present invention has been realized in view of the applicability to a glossy medium having small ink absorption, and is characterized by inclusion of a particulate color material, particular surfactants, aqueous organic solvent, and water. In the present invention, especially it is undesirable to use, instead of the particulate color material, aqueous dye which is used in a general aqueous inkjet ink, from the viewpoint of image density. The ink of the present invention is characterized by its smaller surface tension than that of a normal inkjet ink, its excellent wettability, and strong penetration ability into the medium exhibited by the carrier in the ink, because of the effect of the surfactant for use in the present invention. According to these characteristics, it is possible to form relatively stable dots, and avoid fusion of neighboring dots also on the coating paper which has smaller ink absorption than the normal inkjet medium because the coating paper has no ink absorbing layer.

It is necessary to use the particulate color material, because the particulate color material will not penetrate so deeply into the medium with a carrier, which has high penetration ability, and will tend to remain on the surface. Accordingly, it becomes possible to obtain adequate coloring and image density with a small amount of ink. It is possible to achieve adequate drying ability and reduced printing cost by using as small amount of ink as possible when images are formed. In this case, it is also possible to print an image without causing problems such as curling and cockling of the media due to moisture in the ink.

Especially printing images with as small amount of the ink as possible may be very effective when the electrophotographic printing is desired after performing the inkjet printing. When a toner is fixed in an electrophotograhic method, a medium is usually nipped with a high-temperature fixing roller for a certain time period. In this situation, when the water content of the paper is high, a sufficiently high fixing temperature cannot be obtained, resulting in the formation of a blister of the coating layer caused by water vapor swollen in the paper.

In addition, the high wettability of ink may effectively prevent marking of a fingerprint when the media surface is touched with a finger. When an ink has a high surface tension, because of the repellence of the ink, a marking of a fingerprint may be produced. However, when an ink has a low surface tension even in such a situation, a uniform print may be produced.

Specifically, when the above-mentioned ink is used, the maximum ink adhesion amount (regulated total ink amount value) at the time of image formation may be 20 g/m². The image formation with the ink adhesion amount of 20 g/m² or less may produce very high quality images without causing beading or bleeding.

The penetration amount of carrier may be easily controlled by controlling the amount of the surfactant which is represented by the structural formula (1).

—Ink Fixing Agent—

Preferably the ink contains a water dispersible resin component which promotes fixation of a color material pigment. The resin component that promotes fixation of the color material pigment is a resin component that keeps binding ability at a certain level or more between the color material pigment and the medium surface or between the color material pigments. Without this resin component, the color material pigment becomes easily exfoliated after printing. The fixing components may be contained in an ink as a free component or as a component adsorbed or chemically bound onto a surface of color material particles.

—Surface Tension of Ink—

As a condition of the ink for the present invention, it has been found that the ink has very high penetration ability, and a surface tension of 30 mN/m or less. When the surface tension is more than 30 mN/m, the penetration of ink is delayed and an image exudation occurs, and it becomes difficult to obtain high quality images.

The surface tension of the ink at 25° C. is preferably 15 mN/m to 40 mN/m, and more preferably 20 mN/m to 25 mN/m. When the surface tension is less than 15 mN/m, the nozzle plate of the head is excessively wetted and ink droplets cannot be properly formed, exudation on the recording medium of the present invention becomes significant and stable discharge of ink may not be attained. When the surface tension is more than 40 mN/m, the ink sometimes insufficiently penetrates the recording medium, thereby causing beading, and the extension of drying time.

The surface tension of an ink is measured, for example, with a surface tensiometer (CBVP-Z manufactured by Kyowa Interface Science Co., Ltd.) using a platinum plate at a temperature of 25° C.

—Solid Content of Ink—

The solid content of the ink of the present invention is preferably 5% by mass or more. When the concentration is lower than 5% by mass, the increase in viscosity during drying is slow and the image tends to spread easily. The higher the solid content, the more preferred. However, if it is too high, nozzle clogging heavily occurs and loss of image easily occurs. Therefore, it is desirable that the solid content be 5% by mass to 15% by mass.

—Colorant—

Examples of cyan coloring material used in the present invention include C. I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 15:34, 16, 17:1, 22, 56, 60, 63,C. I. Vat Blue 4,and Vat Blue 60. From the standpoint of cost and safety, Phthalocyanine Blue 15:3 is particularly preferred.

Coloring materials for other colors are not particularly limited, as long as they are coloring particles.

As the colorant, a colorant selected from at least any one of a pigment, dye, and colored fine particle is preferably used.

As the colored fine particles, an aqueous dispersion of fine polymer particles containing a coloring material selected from at least any one of a pigment and dye can be advantageously used.

The expression "containing . . . coloring material" herein means either of a state in which the coloring material is encapsulated inside the fine polymer particles, and a state in which the coloring material is adsorbed on the surface of fine polymer particles, or both such states. In this case, it is not necessary that the all coloring materials contained in the ink of the present invention be encapsulated in or adsorbed on the fine polymer particles, and the coloring material may be also dispersed in the emulsion within a range in which the effect of the present invention is not lost. The coloring material is not particularly limited, as long as it is insoluble or has poor solubility in water and can be adsorbed on the polymer, and the coloring material may be appropriately selected according to the purpose.

The expression "insoluble or has poor solubility in water" means that the coloring material is not dissolved in an amount of 10 parts by mass or more in 100 parts by mass of water at a temperature of 20° C. "Soluble" means that no separation or precipitation of the coloring material can be visually observed in the surface layer or lower layer of aqueous solution.

The volume-average particle size of fine polymer particles (colored fine particles) containing the coloring material is preferably 0.01 µm to 0.16 µm in the ink. When the particle size is less than 0.01 µm, the fine particles easily flow, thereby increasing the ink exudation and degrading light resistance. On the other hand, the particle size is more than 0.16 µm, the nozzle is easily clogged and color development ability is decreased.

Examples of colorants include dyes such as water-soluble dyes, oil-soluble dyes and dispersed dyes, and pigments. Oil-soluble dyes and dispersed dyes are preferred from the standpoint of adsorption ability and sealing ability, but pigments can be advantageously used to ensure light resistance of the image to be obtained.

From the standpoint of effective impregnation into the fine polymer particles, it is preferred that the dyes be dissolved to a concentration of 2 g/L or more, more preferably 20 g/L to 600 g/L, in an organic solvent such as a ketone solvent.

The water-soluble dyes can be classified into acidic dyes, direct dyes, basic dyes, reactive dyes, and food dyes, based on the color index thereof, and it is preferred that dyes excelling in water resistance and light resistance be used.

The amount of the colorant added to the ink is preferably 2% by mass to 15% by mass and more preferably 3% by mass to 12% by mass. When the amount of the colorant is less than 2% by mass, image density may be decreased due to lowered coloring strength, and feathering or exudation may be adversely affected due to lowered viscosity. When the amount of the colorant is more than 15% by mass, a nozzle easily dries up, for example, when the inkjet recording apparatus is allowed to stand, resulting in a no-discharge phenomenon. Furthermore, due to the excessively high viscosity, penetration ability is decreased and dots less spread. Therefore, image density may be decreased and rough image may be obtained.

—Penetrating Agent—

As the penetrating agent, water-soluble organic solvents such as polyol compounds and glycol ether compounds are used. Particularly, at least any one of polyol compounds having 8 or more carbon atoms and glycol ether compounds is preferably used.

When the number of carbon atoms in the polyol compound is less than 8, sufficient penetration ability cannot be obtained, recording medium is contaminated during printing on both sides, spread of ink on the recording medium is insufficient, and cover ratio of pixel is decreased. As a result, character quality or image density may be decreased.

Examples of polyol compounds having 8 or more carbon atoms include 2-ethyl-1,3-hexanediol (solubility 4.2% at 25° C.) and 2,2,4-trimethyl-1,3-pentanediol (solubility 2.0% at 25° C.).

The glycol ether compounds are not particularly limited and may be appropriately selected according to the purpose. Examples thereof include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

The amount of the penetrating agent added to the ink is not particularly limited and may be appropriately selected according to the purpose. It is preferably 0.1% by mass to 20% by mass, and more preferably 0.5% by % by mass to 10% by mass.

The amount of the aqueous organic solvent added to the ink is preferably 0.1% by mass to 20% by mass, and more preferably 0.5% by mass to 10% by mass.

—Wetting Agent—

It is necessary to use an aqueous organic solvent in addition to the coloring materials so as to make physical properties of a recoding liquid of the present invention a desired state or to prevent nozzle clogging due to drying on the recording head. The aqueous organic solvent includes wetting agent, and penetrating agent. The wetting agent is added so as to prevent nozzle clogging of the recording head due to drying.

The wetting agent is not particularly limited and may be appropriately selected according to the purpose. For example, at least one selected from polyol compounds, lactam compounds, urea compounds, and saccharides is advantageously used.

Examples of polyol compounds include polyhydric alcohols, polyhydric alcohol alkyl ethers, polyhydric alcohol aryl ethers, nitrogen-containing heterocyclic compounds, amides, amines, sulfur compounds, propylene carbonates, and ethylene carbonate. These may be used alone or in combination.

Examples of polyhydric alcohols include ethylene glycol, diethylene glycol, triethylene glycol, polyethylene glycol, polypropylene glycol, 1,3-propanediol, 1,3-butanediol, 1,4-butanediol, 3-methyl-1,3-butanediol, 1,3-propanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen-containing heterocyclic compounds include N-methyl-2-pyrrolidone, N-hydroxyethyl-2-pyrrolidone, 2-pyrrolidone, 1,3-dimethylimidazolidinone, and ∈-caprolactam.

Examples of amides include formamide, N-methylformamide, formamide, N,N-dimethyl formamide.

Examples of amines include monoethanolamine, diethanolamine, triethanolamine, monoethylamine, diethylamine, and triethylamine.

Examples of sulfur compounds include dimethylsulfoxide, sulfolan, and thiodiethanol.

Of these compounds, from the standpoint of obtaining excellent effect in solubility and preventing discharge failure due to moisture evaporation, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, or N-hydroxyethyl-2-pyrrolidone is suitably used.

As the lactam compound, at least one selected from 2-pyrrolidone, N-methyl-2-pyrrolidone, N-hydroxyethyl-2-pyrrolidone, and c-caprolactam may be used.

As the urea compound, at least one selected from urea, thiourea, ethyleneurea, and 1,3-dimethyl-2-imidazolidinone may be used. The amount of the urea compound added to the ink is generally preferably 0.5% by mass to 50% by mass and more preferably 1% by mass to 20% by mass.

Examples of saccharides include monosaccharides, disaccharides, oligosaccharides (including trisaccharides and tetrasaccharides), polysaccharides, and derivatives thereof. Of these, glucose, mannose, fructose, ribose, xylose, arabinose, galactose, maltose, cellobiose, lactose, sucrose, trehalose, and maltotriose are preferred; maltitose, sorbitose, gluconolactone, and maltose are particularly preferred.

The polysaccharides mean sugars in a broad sense and may include substances widely present in nature, such as α-cyclodextrin and cellulose.

Examples of the derivatives of the saccharides include reduced sugar of the saccharides (for example, sugar alcohol, represented by a general formula $HOCH_2(CHOH)_nCH_2OH$ (where n represents an integer of 2 to 5)), oxidized sugar (for example, aldonic acid and uronic acid), amino acids, and thio acid. Of these, sugar alcohol is preferred. Examples of sugar alcohols include maltitol and sorbitol.

The amount of the wetting agent contained in the ink is 10% by mass to 50% by mass and more preferably 20% by mass to 35% by mass. When the amount of the contained wetting agent is too small, a nozzle may be easily dried, causing abnormal discharge of ink droplets. When the amount of the contained wetting agent is too large, viscosity of ink increases, exceeding the appropriate viscosity range.

—Surfactant—

According to the present invention, wetting ability and penetration ability of the ink to recording paper may be improved by using a surfactant, especially a fluorine surfactant having a particular structure. A fluorine surfactant is generally known to have a high foaming ability when used in an ink, and an adverse effect on ink filling and ink ejection stability. Meanwhile, the fluorine surfactant having a particular structure used in the present invention has a low foaming ability, is excellent in ink filling, ink ejection stability, and safety, and, on the inkjet recording medium of the present invention, has a high color developing ability and an excellent homogeneity of colorant, and produces very low beading and excellent images. Although it is not fully understood, because of its structure, the fluorine surfactant having a particular structure used in the present invention is excellent in leveling ability, has a strong homogenizing effect on surface tension at the air-liquid interface, is excellent in anti foaming ability, and, on the inkjet recording medium, has effects of uniformly dispersing the colorant and spreading wet dots to produce uniform pixels owing to this leveling ability, and possibly produces very weak beading, resulting, when the fluorine surfactant is used in combination with the inkjet recording medium and the inkjet recording pigment ink of the present invention, in production of an ideal inkjet recording ink which is cheap, is excellent in image quality, density, glossiness, and image reliability, is capable of providing print which achieves similar quality to the commercial print, and is excellent in an ejection stability, and storage stability; an inkjet recording ink set,; an inkjet recording ink medium set; and an inkjet recording apparatus.

In addition to the fluorine surfactant which is represented by the above structural formula (1) and used in the present invention, the following fluorine activation agent may be used: perfluoroalkyl sulfonic acid salt, perfluoroalkyl carboxylic acid salt, perfluoroalkyl phosphate ester, perfluoroalkyl ethylene oxide adduct, perfluoroalkyl betaine, perfluoroalkylaminoxide compound; examples of their commercially available products are SURFLON S-111,S-112,S-113,S121,S131,S132, S-141,and S-145 (manufactured by Asahi Glass Co., Ltd); FLUORAD FC-93,FC-95, FC-98,FC-129,FC-135,FC-170C, FC-430,FC-431,and FC-4430 (manufactured by Sumitomo 3M Limited); MEGAFACE F-470, F-1405,and F474 (manufactured by DIC Corporation); ZONYL FS-300, FSN, FSN-100,and FSO (manufactured by DuPont); FTOP EF-351, 352, 801,and 802 (manufactured by NEOS Company Limited). These are easily obtainable and used in the present invention. Among these, ZONYL FS-300,FSN, FSN-100,and FSO (manufactured by DuPont), which are excellent in especially reliability and color developing ability, may be suitably used.

Furthermore the surfactant which can be used in combination with the above fluorine compound includes, for example, interface polyoxyethylene alkyl ether acetic acid salt, dialkyl sulfosuccinic acid ester, polyoxyethylene alkyl ether, polyoxyethylene alkylphenyl ether, polyoxyethylene-polyoxypropylene block copolymer, polyoxyethylenealkyl ester, polyoxyethylenesorbitan fatty acid ester, and acetyleneglycol surfactant. More specifically, when at least one of polyoxyethylene alkyl ether acetic acid salt and dialkylsulfosuccinic acid with an alkyl chain having 5 to 7 carbon atoms is used for the anionic surfactant, wetting ability with regular paper becomes excellent. Note that the surfactant mentioned above can exist in the ink of the present invention stably without disturbing a dispersed state of the ink.

A polyol having 7 to 11 carbon atoms which is used for a penetrating agent in the present invention includes, for example, 2-ethyl-1,3 hexanediol and 2,2,4-trimethyl-1,3,-pentanediol. The amount of polyol added is preferably 0.1% by mass to 20% by mass, and more preferably 0.5% by mass to 10% by mass. When the amount of polyol added is less than 0.1% by mass, penetration ability of the ink into paper may become poor, the ink may produce contamination due to friction caused by a roller at the time of conveyance, or contamination of a conveying belt with the ink at the time of flip of a paper sheet for printing and thus may not be used in high-speed printing and printing on both sides. When the amount of polyol added is more than 20% by mass or more, image sharpness may be degraded because the diameter of a printing dot may become large and the width of lines of a character may become wide.

—Pigment Fixing Agent—

Any rein emulsion may be used for a pigment fixing agent.

—Resin Emulsion—

In the resin emulsion, fine resin particles are dispersed in water as a continuous phase. The resin emulsion may include a dispersant such as a surfactant, as necessary.

As the dispersed phase, the amount of fine resin particles (amount of fine resin particles in the resin emulsion) is generally preferably 10% by mass to 70% by mass. Moreover, with consideration for the use in an inkjet recording apparatus, the fine resin particles have an average particle diameter of preferably 10 nm to 1,000 nm and more preferably 20 nm to 300 nm.

The fine resin particle component of the dispersed phase is not particularly limited and may be appropriately selected according to the purpose. Examples thereof include an acrylic resin, vinyl acetate resin, styrene resin, butadiene resin, styrene-butadiene resin, vinyl chloride resin, acryl-styrene resin, and acryl-silicone resin. Of these, acryl-silicone resin is particularly preferred.

As the resin emulsion, appropriately synthesized resin emulsions or commercially available products may be used.

Examples of commercially available products include Microgel E-1002 and E-5002 (styrene-acrylic resin emulsions manufactured by Nippon Paint Co., Ltd.), Boncoat 4001 (acrylic resin emulsion manufactured by DIC Corporation), Boncoat 5454 (styrene-acrylic resin emulsion manufactured by DIC Corporation), SAE-1014 (styrene-acrylic resin emulsion manufactured by Zeon Corporation), Saivinol SK-200 (acrylic resin emulsion manufactured by Saiden Chemical Industry Co., Ltd.), Primal AC-22 and AC-61 (acrylic resin emulsions manufactured by Rohm and Haas Co., Ltd.), Nanocryl SBCX 2821 and 3689 (acrylic silicone resin emulsions manufactured by Toyo Ink Mfg. Co. Ltd.), and #3070 (methyl methacrylate copolymer resin emulsion manufactured by Mikuni Color Ltd.).

It is preferred that the amount of fine resin particles of the resin emulsion that is added to the ink be 0.1% by mass to 50% by mass, more preferably 0.5% by mass to 20% by mass, and still more preferably 1% by mass to 10% by mass. When the amount of fine resin particles is less than 0.1% by mass, a sufficient effect cannot be obtained in preventing clogging and improving discharge stability, and when the amount is more than 50% by mass, it may decrease the storage stability of the ink.

—Other Components—

Other components are not particularly limited and may be appropriately selected according to the purpose. Examples thereof include pH adjusting agents, antiseptic/antifungal agents, antirust agents, antioxidants, UV absorbers, oxygen absorbers, and photostabilizers.

—Antiseptic/Antifungal Agent—

Examples of antiseptic/antifungal agents include 1,2-benzisothiazolin-3-one, sodium dehydroacetate, sodium sorbate, 2-pyridinethiol-1-oxide sodium, sodium benzoate, and pentachlorophenol sodium.

—pH Adjuster—

The pH adjusting agents are not particularly limited and any substance can be used according to the purpose, as long as it can adjust pH to 7 or more, without adversely affecting the ink to be prepared. Examples of suitable pH adjusting agents include alkali metal hydroxides such as lithium hydroxide, sodium hydroxide, and potassium hydroxide; ammonium hydroxide; quaternary ammonium hydroxide; quaternary phosphonium hydroxide; carbonate of an alkali metal, lithium carbonate, sodium carbonate, and potassium carbonate; amines such as diethanolamine and triethanolamine and boric acid, hydrochloric acid, nitric acid, sulfuric acid, and acetic acid.

—Antirust—

When the antirust is incorporated in the ink, it becomes possible to form a coat on a metal surface of the head which is wetted and thereby prevent corrosion. Examples of the antirust agents include acidic sulfite, sodium thiosulfate, ammonium thiodiglycolate, diisopropyl ammonium nitrate, pentaerythritol tetranitrate, and dicyclohexylammonium nitrate —Antioxidant—

When the antioxidant is contained in the ink, it becomes possible to prevent corrosion by the antioxidant's annihilation of a radical species even when the radical species, which causes corrosion, has been produced. Examples of the antioxidants include phenol antioxidants (including hindered phenol antioxidants), amine antioxidants, sulfur antioxidants, and phosphorus antioxidants.

Examples of the phenol antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propion yloxy]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetraxis[methylene-3-(3',5'-di-tert-butyl-4'-hydroxyphenyl) propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), and tetraxis[methylene-3-(3,5-di-tert-butyl-4-dihydroxyphenyl)propionate]methane, and 1,1,3-tris(2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole, and dilauryl sulfite.

Examples of the phosphorous antioxidants include triphenyl phosphite, octadecyl phosphite, triisodecyl phosphite, trilauryl trithiophosphite, and trinonylphenyl phosphite.

—Ultraviolet Ray Absorber—

Examples of the UV absorbers include benzophenone ultraviolet ray absorbers, benzotriazole ultraviolet ray absorbers, salicylate ultraviolet ray absorbers, cyanoacrylate ultraviolet ray absorbers, and nickel complex salt ultraviolet ray absorbers.

Examples of the benzophenone ultraviolet ray absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet ray absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet ray absorbers include phenyl salicylate, p-tert-butylphenyl salicylate, and p-octylphenyl salicylate.

Examples of the cyanoacrylate ultraviolet ray absorbers include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the ultraviolet ray absorbers of nickel complex salts include nickel bis(octylphenyl) sulfide, 2,2'-thiobis (4-tert-octylphelate)-n-butylamine nickel (II), 2,2'-thiobis(4-tert-octylphelate)-2-ethylhexylamine nickel (II) and 2,2'-thiobis(4-tert-octylphelate)triethanolamine nickel (II).

[Preparation of Ink]

The ink of the present invention contains at least water, a colorant, a water soluble organic solvent, a wetting agent and a surfactant, and further contains other components, as necessary. These components are dispersed or dissolved in an aqueous solvent, and further stirred and mixed as necessary, so as to produce the ink of the present invention. The dispersing may be performed with a sand mill, a homogenizer, a ball mill, a paint shaker, or an ultrasonic dispersing machine, and the stirring and mixing may be performed by using a stirring machine using a typical blade, a magnetic stirrer, or a high-speed dispersing machine.

Physical properties of the ink such as viscosity, surface tension, and pH are preferably within the following ranges.

Viscosity of the ink at a temperature of 25° C. is preferably 1 cps to 30 cps, and more preferably 2 cps to 20 cps. When the viscosity is higher than 20 cps, discharge stability may be difficult to be ensured.

The pH is preferably 7 to 10,for example.

Colors of the ink are not particularly limited, may be appropriately selected depending on the purpose; examples thereof include yellow, magenta, cyan, and black. Polychromatic image formation may be carried out using an ink set having two or more colors, and full-color image formation may be carried out using an inset set having full colors.

—Printer—

The ink of the present invention in the ink media set can be advantageously used in printers using the following inkjet heads: a so-called piezo-type inkjet head in which a piezoelectric element is used as a pressure generating unit that pressurizes ink located in an ink channel to deform an oscillation plate forming a wall surface of the ink channel, and the internal volume of the ink channel is changed thereby discharging an ink droplet (see Japanese Patent Application Laid-Open (JP-A) No. 02-51734), a so-called thermal-type inkjet head that uses a heat-generating resistor to heat the ink in an ink channel and generate gas bubbles (see JP-A No. 61-59911), and an electrostatic inkjet head in which an oscillation plate forming a wall surface of an ink channel is disposed opposite an electrode and the oscillation plate is deformed by electrostatic forces generated between the oscillation plate and the electrode so as to change the internal volume of the ink channel, thereby discharging an ink droplet (see JP-A No. 06-71882).

(Image Forming Method and Image Forming Apparatus)

The inkjet recording apparatus of the present invention contains at least an inkjetting unit, and further includes other units suitably selected as necessary, such as a stimulus generating unit and a controlling unit.

The image forming method of the present invention includes at least an inkjetting step, and further includes other steps suitably selected as necessary, such as a stimulus generating step and a controlling step.

The inkjet recording method of the present invention can be suitably performed by the inkjet recording apparatus of the present invention, and the inkjetting step can be suitably performed by the inkjetting unit. Also, other steps can be suitably performed by other units.

—Inkjetting Step and Inkjetting Unit—

The inkjetting step is a step of jetting the ink of the present invention in the ink media set by applying a stimulus to the ink so as to record an image on a recording medium.

The inkjetting unit is a unit configured to jet the ink in the ink media set by applying a stimulus to the ink so as to record an image on a recording medium in the ink media set. The inkjetting unit is not particularly limited, and examples thereof include various nozzles for discharging the ink.

The stimulus can be generated, for example, by the stimulus generating unit, and the stimulus is not particularly limited and may be suitably selected according to the purpose. Examples thereof include heat, pressure, vibration and light. These may be used alone or in combination. Of these, heat and pressure are preferable.

Examples of the stimulus generating units include heaters, pressurizers, piezoelectric elements, vibration generators, ultrasonic oscillators and lights. Specific examples thereof include a piezoelectric actuator such as a piezoelectric element, a thermal actuator that utilizes phase transition caused by film boiling of a liquid by using a thermoelectric conversion element such as an exothermic resistive element, a shape-memory-alloy actuator that utilizes metal phase transition caused by temperature variations, and an electrostatic actuator using electrostatic force.

The aspect of the jetting of the inkjet ink in the ink media set is not particularly limited and varies according to the kinds of the stimulus or the like. In the case where the stimulus is "heat", there is, for example, a method in which thermal energy corresponding to a recording signal is applied to the inkjet ink in a recording head, using a thermal head or the like, bubbles are generated in the ink by the thermal energy, and the ink is discharged as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink channel in a recording head, the piezoelectric element bends, the volume of the pressure chamber decreases, and thus the inkjet ink is discharged as droplets from nozzle holes of the recording head.

It is desirable that the ink droplets jetted be, for example, 1 pL to 40 pL in size, 5 m/s to 20 m/s in discharge velocity, 1 kHz or greater in drive frequency and 300 dpi or greater in resolution.

The controlling unit is not particularly limited and may be suitably selected according to the purpose, as long as it can control operations of the aforementioned units. Examples thereof include apparatuses such as a sequencer and a computer.

In this instance, an explanation is made by referring to an example applied to a serial type (shuttle-type) inkjet recording apparatus at which the carriage scans. The inkjet recording apparatus is also applicable to a line-type inkjet recording apparatus equipped with a line-type head.

The inkjet recording apparatus and the inkjet recording method of the present invention are applicable to various types of recording by an inkjet recording method, and in particular advantageously applicable, for example, to printers, facsimile devices, copiers, and printer/fax/copier multipurpose machines for inkjet recording.

(Ink Record)

An ink record is recorded by means of the inkjet recording method of the present invention. The ink record has an image formed on a recording medium of the ink media set using the ink of the ink media set, according to the present invention.

The ink records have a high image quality with less ink exudation and excel in stability over time, and thus the ink records may be suitably used for various purposes as documents on which various printing and/or images are recorded.

EXAMPLES

Hereinafter, examples of the present invention will be described, however, the examples should not be construed as limiting the present invention.

<Preparation of Pigment Ink>

Production Example 1

Dispersion Containing Cyan Pigment

—Preparation of Fine Polymer Particle Dispersion Containing Copper Phthalocyanine Pigment—

An inside of a 1-L flask equipped with a mechanical stirrer, a thermometer, a nitrogen gas introducing tube, a reflux tube and a drop funnel was sufficiently replaced with nitrogen gas, then 11.2 g of styrene, 2.8 g of acrylic acid, 12.0 g of lauryl methacrylate, 4.0 g of polyethylene glycol methacrylate, 4.0 g of styrene macromer (product name: AS-6 manufactured by TOAGOSEI CO., LTD.) and 0.4 g of mercaptoethanol were loaded therein, and the temperature was raised to 65° C. Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (product name: AS-6 manufactured by TOAGOSEI CO., LTD.), 3.6 g of mercaptoethanol, 2.4 g of azobis dismethylvaleronitrile and 18 g of methyl ethyl ketone was dripped for 2.5 hours in the flask.

After dripping, a mixed solution of 0.8 g of azobis dimethylvaleronitrile and 18 g of methyl ethyl ketone was dripped for 0.5 hours in the flask. After maturing at 65° C. for one hour, 0.8 g of azobis dimethylvaleronitrile was added, and the mixture was further matured for one hour. After the termination of the reaction, 364 g of methyl ethyl ketone was added in the flask to prepare 800 g of a polymer solution having a concentration of 50% by mass. A part of the polymer solution was then dried and measured by gel permeation chromatography (standard: polystyrene, solvent: tetrahydrofuran). The mass-average molecular mass was 15,000.

Then, 28 g of the obtained polymer solution, 26 g of copper phthalocyanine pigment, 13.6 g of an aqueous solution of potassium hydroxide with a concentration of 1 mol/L, 20 g of methyl ethyl ketone, and 30 g of ion-exchanged water were thoroughly stirred. A total of 20cycles of kneading were then performed using a three-roll mill (product name: NR-84A, manufactured by Noritake Company). The obtained paste was added to 200 g of ion-exchanged water, and the mixture was sufficiently stirred. Thereafter, the mixture was treated with an evaporator so as to evaporate methyl ethyl ketone and water, to thereby obtain 160 g of a blue colored fine polymer particle dispersion having solid content of 20.0% by mass.

The average particle diameter (D50%) of the obtained fine polymer particles which was measured by a particle size distribution measurement device (Microtrack UPA, manufactured by Nikkiso Co. Ltd.) was 93 nm.

Production Example 2

Dispersion Containing Magenta Pigment

—Preparation of Fine Polymer Particle Dispersion Containing Dimethylquinacridone Pigment—

A red purple colored fine polymer particle dispersion was prepared in the same manner as in Production Example 1,except that the copper phthalocyanine pigment in Production Example 1 was replaced with Pigment Red 122.

The average particle diameter (D50%) of the obtained fine polymer particles which was measured by a particle size distribution measurement device (Microtrack UPA, manufactured by Nikkiso Co. Ltd.) was 127 nm.

Production Example 3

Dispersion Containing Yellow Pigment

—Preparation of Fine Polymer Particle Dispersion Containing Monoazo Yellow Pigment—

A yellow colored fine polymer particle dispersion was prepared in the same manner as in Production Example 1,except that the copper phthalocyanine pigment in Production Example 1 was replaced with Pigment Yellow 74.

The average particle diameter (D50%) of the obtained fine polymer particles which was measured by a particle size distribution measurement device (Microtrack UPA, manufactured by Nikkiso Co. Ltd.) was 76 nm.

Production Example 4

Dispersion Containing Black Pigment

—Preparation of Carbon Black Dispersion—

In 1,000 mL of water, 300 g of commercial acidic carbon black having pH 2.5 (product name: Monarch 1300,manufactured by Cabot Corporation) was mixed thoroughly. Then, 450 g of sodium hypochlorite (effective chlorine concentration: 12%) was added dropwise and stirred for 8 hours at 100° C. to 105° C. In this liquid, 100 g of sodium hypochlorite (effective chlorine concentration: 12%) was then added, and dispersed for 3 hours in a horizontal disperser. The obtained slurry was diluted tenfold with water, and then pH was adjusted with lithium hydroxide, and the slurry was desalted and concentrated with an ultrafiltration membrane to an electric conductivity of 0.2 mS/cm to obtain a carbon black dispersion liquid having a pigment concentration of 15%. Subsequently, coarse particles were removed by centrifuging, and filtrated through a 1 μm Nylon filter to obtain a carbon black dispersion liquid.

The average particle diameter (D50%) of the obtained fine polymer particles which was measured by a particle size distribution meter (Microtrack UPA, manufactured by Nikkiso Co.) was 95 nm.

Next, ink compositions were prepared by using the fine polymer particle dispersions obtained by Production Examples 1 to 4 and carbon black dispersion liquid.

Production Example 5

—Preparation of Cyan Ink Composition 1—

A total of 20.0% by mass of the fine polymer particle dispersion containing copper phthalocyanine pigment of Production Example 1, 23.0% by mass of 3-methyl-1,3-butanediol, 8.0% by mass of glycerin, 2.0% by mass of 2-ethyl-1,3-hexanediol, 2.5% by mass of FS-300 (manufactured by DuPont), 0.2% by mass of Proxel LV (manufactured by Avecia Co.), 0.5% by mass of 2-amino-2-ethyl-1,3-propanediol, and an appropriate amount of ion-exchanged water were added to obtain 100% by mass. Filtration was performed with a membrane filter having an average pore diameter of 0.8 μm. The solid content was then adjusted to 12% by mass with ion-exchanged water. Thus, an ink composition was prepared. The obtained ink composition had a viscosity of 9 mPa·s at a temperature of 25° C., and a surface tension of 25 mN/m. The viscosity was measured at 25° C. with a viscometer (rotary viscometer R500, manufactured by Toki Sangyo Co., Ltd.).

Production Example 6

—Preparation of Magenta Ink Composition 1—

A total of 20.0% by mass of the fine polymer particle dispersion containing dimethylquinacridone pigment of Production Example 2, 22.5% by mass of 3-methyl-1,3-butanediol, 9.0% by mass of glycerin, 2.0% by mass of 2-ethyl-1,3-hexanediol, 2.5% by mass of FS-300 (manufactured by DuPont), 0.2% by mass of Proxel LV (manufactured by Avecia Co.), 0.5% by mass of 2-amino-2-ethyl-1,3-propanediol, and an appropriate amount of ion-exchanged water were added to obtain 100% by mass. Filtration was then performed with a membrane filter having an average pore diameter of 0.8 µm. The solid content was then adjusted to 12% by mass with ion-exchanged water. Thus, an ink composition was prepared. The obtained ink composition had a viscosity of 9 mPa·s at a temperature of 25° C. and a surface tension of 25 mN/m.

Production Example 7

—Preparation of Yellow Ink Composition 1—

A total of 20.0% by mass of the fine polymer particle dispersion containing monoazo yellow pigment of Production Example 3, 24.5% by mass of 3-methyl-1,3-butanediol, 8.0% by mass of glycerin, 2.0% by mass of 2-ethyl-1,3-hexanediol, 2.5% by mass of FS-300 (manufactured by DuPont), 0.2% by mass of Proxel LV (manufactured by Avecia Co.), 0.5% by mass of 2-amino-2-ethyl-1,3-propanediol, and an appropriate amount of ion-exchanged water were added to obtain 100% by mass. Filtration was then performed with a membrane filter having an average pore diameter of 0.8 µm. The solid content was then adjusted to 12% by mass with ion-exchanged water. Thus, an ink composition was prepared. The obtained ink composition had a viscosity of 9 mPa·s at a temperature of 25° C. and a surface tension of 25 mN/m.

Production Example 8

—Preparation of Black Ink Composition 1—

A total of 20.0% by mass of carbon black dispersion liquid of Production Example 4, 22.5% by mass of 3-methyl-1,3-butanediol, 7.5% by mass of glycerin, 2.0% by mass of 2-pyrrolidone, 2.0% by mass of 2-ethyl-1,3-hexanediol, 2.0% by mass of a compound represented by R—$(OCH_2CH_2)_n$OH (where R represents an alkyl group having 12 carbon atoms; n=9), 0.2% by mass of Proxel LV (manufactured by Avecia Co.), 0.5% by mass of 2-amino-2-ethyl-1,3-propanediol, and an appropriate amount of ion-exchange water were added to obtain 100% by mass. Filtration was then performed with a membrane filter having an average pore diameter of 0.8 µm. The solid content was then adjusted to 12% by mass with ion-exchanged water. Thus, an ink composition was prepared. The obtained ink composition had a viscosity of 9 mPa·s at a temperature of 25° C. and a surface tension of 25 mN/m.

Production Example 9

<Preparation of Dye Ink>

The below-described components were mixed, stirred thoroughly to be dissolved, and pressure filtered through a Floropore filter (product name, manufactured by Sumitomo Electric Industries, Ltd.) having a pore size of 0.45 µm to prepare a dye ink set.

The dye ink composition was as follows:

Dye Ink Composition

Dyes
- Yellow: C. I. Direct Yellow 86
- Cyan: C. I. Direct Blue 199
- Magenta: C. I. Acid Red 285
- Black: C. I. Direct Black 154

Formulation

| | |
|---|---|
| Dye | 4 parts |
| Glycerin | 7 parts |
| Thiodiglycol | 7 parts |
| Urea | 7 parts |
| Acetylene glycol | 1.5 parts |
| Water | 73.5 parts |

The obtained ink composition had a viscosity of 4 mPa·s at a temperature of 25° C. and a surface tension of about 35 mN/m.

—Production of Medium—

Production Example 10

Production of Base Paper

Production of Support

Into pulp composed of L-BKP (hardwood kraft pulp; beaten to a freeness of 520 ml) (100 parts by mass), 0.3 parts by mass of an ASA sizing agent, 0.8 parts by mass of cationic starch, and light calcium carbonate were added to prepare adjusted raw material.

A size press liquid containing 15% oxidized starch, 0.1% alkyl ketene dimer sizing agent (SIZEPINE K-287 (AKD), manufactured by Arakawa Chemical Industries, Ltd), and 0.2% anionic polyacrylamide (HARICOAT G-51,manufactured by HARIMA Chemicals, Inc.) was prepared, in addition to the above adjusted raw material.

Using the adjusted raw material and the size press liquid, paper was made with a Fourdrinier paper machine, and size pressed. The amount of light calcium carbonate held by the pulp was 13 parts by mass per 100 parts by mass of the pulp. Size pressing was carried out such that the amount of the dry solid content of size press liquid was total 2.0 g/m² for the two sides of the paper, and thereby base paper having a dry basis weight of 160 g/m² was prepared.

Production Example 11

—Rewetting Liquid—

| | |
|---|---|
| Sodium hexametaphoric acid | 13 parts |
| Formic acid | 35 parts |
| Low molecular weight polyethylene wax (PEM 17, manufactured by SAN NOPCO LIMITED) | 2 parts |

The above components are stirred and dissolved such that the solid content was 1.5%, and thereby rewetting liquid was prepared.

Example 1

Cast coating layer
—Cast Coating Liquid—

| Preparation of pigment mixture liquid | |
|---|---|
| Kaolin (KAOFINE, Thiele Kaolin Company) | 43 parts |
| Light calcium carbonate (TP-123CS, OKUTAMA KOGYO Co., Ltd) | 19 parts |
| Amorphous silica (SYLOID 72W; particle diameter 2.8 μm, pH of 5% dispersion: 6.0 to 8.0; W. R. GRACE & Co., Ltd) | 8 parts |
| Zinc oxide (Zinc oxide, SAKAI CHEMICAL INDUSTRY CO., LTD) | 0.5 parts |
| Sodium polyacrylate (AQUALIC DL-40, Nippon Shokubai Co., Ltd.) | 0.003 parts |
| Styrene-butadiene latex (L-1092, Asahi Kasei Chemicals Corporation) | 20 parts |
| Low molecular weight polyethylene wax (PEM 17, SAN NOPCO) | 0.5 parts |
| Casein (ALACID LACTIC CASEIN, Fonterra Co-operative Group) | 7 parts |
| Ammonia | 1 part |

Above components were mixed according to the mixing ratio indicated above, the mix was dispersed with a mixer (M-40, manufactured by Mitsubishi Heavy Industries, Ltd) such that the solid content of the dispersion was 45%, and thereby a cast coating liquid was prepared. For amorphous silica, SYLOID 72W (particle diameter 2.8 μm, pH of 5% dispersion: 6.0 to 8.0; W. R. GRACE & Co., Ltd) was used.

Particle diameter was measured with a measuring device (Mastersizer, manufactured by Malvern Instruments Ltd) at a focus distance of 45 mm.

Note that casein was previously heat dissolved with steam in a ratio of 100 parts by mass casein to 0.4 parts by ammonia such that the solid content was 15%.

Also a small amount of ammonia and sodium polyacrylate were added to kaolin, light calcium carbonate, zinc oxide, and amorphous silica, and the mix was dispersed with a mixer (M-40,manufactured by Mitsubishi Heavy Industries, Ltd) to prepare a pre-dispersion having a solid content of 57%.
—Cast Coating—

On one side of the above mentioned base paper, cast coating layer was deposited with cast coater by a rewet method.

The coating method was applied as follows.

The base paper was coated with a cast coating material using an air knife such that the dry amount of the coating material becomes 18 g/m². The coated paper was dried by a drier, coated with a rewetting liquid using a dip roll coater, placed on a cast drum having a surface temperature in a moistened state of 100° C., and then pressed under a forming roll, dried, and finally separated from the cast drum using a return roll after drying to prepare a cast coating paper 1.This process was performed at a speed of 40 m/min.

Ink set 1 having four colors, that is, black, yellow, magenta, and cyan was prepared using ink compositions produced in Production Examples 1 to 8,and images were printed using thus obtained ink set 1 and the cast coating paper 1 by means of an inkjet printer (Drop On Demand Printer having a nozzle resolution of 300 dpi, 384 nozzles per row, and total 8 rows; GX5000,manufactured by Ricoh Company, Ltd) with an image resolution of 1,200 dpi (4 pass ½ interless), a large droplet size of 20 pL, a medium droplet size of 10 pL, and a small droplet size of 2 pL. In this printing operation, adhesion amount was controlled with a total volume control of secondary color being set at 140%; in the case of solid image formation, solid images and letters were printed such that a total ink amount in a 300-dot-square was less than 15 g/m². A printing image pattern for this evaluation was constructed using Word2000 (9.0.6926 SP-3) (manufactured by Microsoft Corporation).

An image for evaluating image densities was constructed using a graphic drawing tool of Word2000,and was neighboring seven 5-cm squares (one color for each of seven squares) with colors of lines and solid images being set as respective colors of YMCKRGB via user setting of Word2000.

Color conditions for solid images and lines are:
Yellow (Red 0,Green 255,and Blue 255)
Cyan (Red 255,Green 255,and Blue 0)
Magenta (Red 255,Green 0,and Blue 255)
Red (Red 255,Green 0,and Blue 0)
Green (Red 0,Green 255,and Blue 0)
Blue (Red 0,Green 0,and Blue 255)
Black (Red 0,Green 0,and Blue 0)

<Image Density>

An image patch for evaluating image density in each color of YMCK was measured ten times with a reflective type color spectrophotometric densitometer (manufactured by X-Rite, Incorporated), and the average of ten measurements was taken as the image density. Images having optical densities of less than 1.1 for Y, of less than 1.5 for M, of less than 1.5 for C, and of less than 1.2 for K were evaluated as B.

<Ink Absorption>

Minute unevenness (beading) of image density, which is caused by poor ink absorption, in a chart for measuring image density was visually observed for evaluating ink absorbing ability. Based on a specimen copy indicating minimum allowable density unevenness of images, images having obviously poorer evenness than images of the specimen copy were considered as poor (C).

<Glossiness>

Glossiness at 60° of the background was measured with MICRO-GLOSS GLOSSMETER (BYK-GARDENER).

<Performance in Electrophotography>

The image density charts printed by the above-mentioned IJ method was left at a temperature of 23° C. and a relative humidity of 50% for 12 hr, and the same image as those in the image density charts was printed on blank space of the chart using an electrophotographic copier (IMAGIO MP C5000, manufactured by Ricoh Company, Ltd.).

Failure in paper feeding, occurrence of a blister in the blank space or image space, or occurrence of minute fusion onto a fixing roller was visually observed. Printing completed normally was evaluated as A, and printing in which some abnormality was seen was evaluated as C.

<Performance in Printing>

By using a RI (Rotay Ink) printability tester (manufactured by IHI Machinery and Furnace Co., Ltd.), a solid image was formed with 0.8 cc of a cyan ink, HIGH UNITY NEO SOY (manufactured by TOYO INK MFG. CO., LTD.) on a coated paper. Images produced with some failures in an ink transfer were evaluated as C. In addition, thus produced images were left in an atmosphere of 23° C. and a relative humidity of 50% for 12 hr, and then images were evaluated for the fixability by putting the finger on a 5-cm square in the printed part. Images with no or less ink having been transferred to the finger were evaluated as A, and images with more ink having been transferred to the finger were evaluated as C.

<Strength of Print>

By using a RI (Rotay Ink) printability tester (manufactured by IHI Machinery and Furnace Co., Ltd.), a solid image was formed with 0.8 cc of a cyan ink, HIGH UNITY NEO SOY (manufactured by TOYO INK MFG. CO., LTD.) on a coated paper. An image having a coated layer a part of which was exfoliated was evaluated as C.

<Thickening of Coating Liquid>

Cast coating liquids that have significantly thickened after preparation thereof were evaluated as B.

Example 2

Evaluation of print was carried out in the same manner as in Example 1,except that the formulation of the cast coating liquid was changed to those as follows.

| Kaolin | 43 parts by mass |
|---|---|
| Light calcium carbonate | 24 parts by mass |
| Amorphous silica | 3 parts by mass |
| Zinc oxide | 0.5 parts by mass |
| Sodium polyacrylate | 0.003 parts by mass |
| Low molecular weight polyethylene wax | 0.5 parts by mass |
| Styrene-butadiene latex | 20 parts by mass |
| Casein | 7 parts by mass |
| Ammonia | 1 part by mass |

Example 3

Evaluation of print was carried out in the same manner as in Example 1, except that the formulation of the cast coating liquid was changed to those as follows.

| Kaolin | 36 parts by mass |
|---|---|
| Light calcium carbonate | 19 parts by mass |
| Amorphous silica | 15 parts by mass |
| Zinc oxide | 0.5 parts by mass |
| Sodium polyacrylate | 0.003 parts by mass |
| Low molecular weight polyethylene wax | 0.5 parts by mass |
| Styrene-butadiene latex | 20 parts by mass |
| Casein | 7 parts by mass |
| Ammonia | 1 part by mass |

Example 4

Evaluation of prints was carried out in the same manner as in Example 1, except that the amorphous silica of the formulation of cast coating liquid was changed to SYLOID74X6000 (manufactured by W. R. Grace & Co., Ltd.; Particle diameter: 7.0 μm, pH of the 5% dispersion: 6.0 to 7.0).

Example 5

Evaluation of prints was carried out in the same manner as in Example 1, except that the adhesion amount of the cast coating layer was changed to 6 g/m².

Example 6

Evaluation of prints was carried out in the same manner as in Example 1, except that the adhesion amount of the cast coating layer was changed to 30 g/m².

Example 7

Evaluation of prints was carried out in the same manner as in Example 1, except that the amorphous silica of the formulation of cast coating liquid was changed to SYLOJET P403 (manufactured by W. R. Grace & Co., Ltd.; Particle diameter: 3.0 μm, pH of the 5% dispersion: 3.0 to 3.6).

Example 8

[Example of Use of Dye Ink]
Evaluation of prints was carried out in the same manner as in Example 1, except that the ink used in printing was changed to dye ink of Production Example 9. The results are indicated in Tables 1-1 and 1-2.

Comparative Example 1

Evaluation of prints was carried out in the same manner as in Example 1, except that the formulation of the cast coating liquid was changed to the following formulation.

| Kaolin | 46 parts by mass |
|---|---|
| Light calcium carbonate | 23.5 parts by mass |
| Amorphous silica | 0.5 parts by mass |
| Zinc oxide | 0.5 parts by mass |
| Sodium polyacrylate | 0.003 parts by mass |
| Low molecular weight polyethylene wax | 0.5 parts by mass |
| Styrene-butadiene latex | 20 parts by mass |
| Casein | 7 parts by mass |
| Ammonia | 1 part by mass |

[Example of Excessive Amount of Silica Contained]

Comparative Example 2

Evaluation of prints was carried out in the same manner as in Example 1, except that the formulation of the cast coating liquid was changed to the following composition.

| Kaolin | 32 parts by mass |
|---|---|
| Light calcium carbonate | 13 parts by mass |
| Amorphous silica | 25 parts by mass |
| Zinc oxide | 0.5 parts by mass |
| Sodium polyacrylate | 0.003 parts by mass |
| Low molecular weight polyethylene wax | 0.5 parts by mass |
| Styrene-butadiene latex | 20 parts by mass |
| Casein | 7 parts by mass |
| Ammonia | 1 part by mass |

TABLE 1-1

| | Ex. 1 | Ex. 2 | Ex. 3 | Ex. 4 | Ex. 5 |
|---|---|---|---|---|---|
| Kaolin | 43 | 43 | 36 | 43 | 43 |
| Light Calcium Carbonate | 19 | 24 | 19 | 19 | 19 |
| Amorphous Silica | 8 | 3 | 15 | 8 | 8 |
| Silica | 72W[b] | 72W[b] | 72W[b] | 74 × 6000[b] | 72W[b] |
| Silica particle diameter (μm)[a] | 2.8 | 2.8 | 2.8 | 7 | 2.8 |
| pH of 5% silica dispersion | 6.0-8.0 | 6.0-8.0 | 6.0-8.0 | 6.0-7.0 | 6.0-8.0 |
| Thickening of coating liquid | A | A | A | A | A |
| Coat amount (g/m²) | 18 | 18 | 18 | 18 | 6 |
| Ink | Pigment | Pigment | Pigment | Pigment | Pigment |
| Ink absorption | A | A | A | A | A |
| Image density | A | A | A | A | A |
| Glossiness 60° | 63 | 76 | 45 | 45 | 53 |
| Performance in printing | A | A | A | A | A |
| Strength of print | A | A | A | A | A |
| Performance in electrophotography | A | A | A | A | A |

[a] Values in Catalogue, measured with Mastersizer. Focal distance: 45 mm.
[b] SYLOID

TABLE 1-2

| | Ex. 6 | Ex. 7 | Ex. 8 | Comp. Ex. 1 | Comp. Ex. 2 |
|---|---|---|---|---|---|
| Kaolin | 43 | 43 | 43 | 46 | 32 |
| Light Calcium Carbonate | 19 | 19 | 19 | 23.5 | 13 |
| Amorphous Silica | 8 | 8 | 8 | 0.5 | 25 |
| Silica | 72W[b] | P403[c] | 72W[b] | 72W[b] | 72W[b] |
| Silica particle diameter (μm)[a] | 2.8 | 3 | 2.8 | 2.8 | 2.8 |
| pH of 5% silica dispersion | 6.0-8.0 | 3.0-3.6 | 6.0-8.0 | 6.0-8.0 | 6.0-8.0 |
| Thickening of coating liquid | A | C | A | A | A |
| Coat amount (g/m²) | 30 | 18 | 18 | 18 | 18 |
| Ink | Pigment | Pigment | Dye | Pigment | Pigment |
| Ink absorption | A | B | A | C | A |
| Image density | A | A | C | A | A |

TABLE 1-2-continued

| | Ex. 6 | Ex. 7 | Ex. 8 | Comp. Ex. 1 | Comp. Ex. 2 |
|---|---|---|---|---|---|
| Glossiness 60° | 68 | 60 | 63 | 78 | 35 |
| Performance in printing | A | B | A | B | A |
| Strength of print | A | B | A | A | B |
| Performance in electrophotography | A | B | A | A | A |

[a] Values in Catalogue, measured with Mastersizer. Focal distance: 45 mm.
[b] SYLOID
[c] SYLOJET Industrial Applicability A recording medium, an ink, and a recording method according to the present invention may provide a recording image at a high speed which is excellent in print quality and glossiness, and are further preferably used in an ink record, an inkjet recording apparatus, and an inkjet recording method. In addition, printed matter thus obtained may be excellent in abrasion resistance of images and handling ability immediately after printing. Also a medium, and recorded matter of the present invention may be used in offset printing, electrophotography, and a combination thereof. The inkjet recording method of the present invention are applicable to various types of recording by an inkjet recording system, and in particular advantageously applicable, for example, to printers, facsimile devices, copiers, and printer/fax/copier multipurpose machines for inkjet recording.

The invention claimed is:

1. A printing medium, comprising:
base paper; and
a coating layer,
wherein the coating layer is directly formed on the base paper by a cast coating method with a coating liquid,
wherein the coating liquid comprises kaolin and amorphous silica, wherein the amorphous silica is such that a dispersion having 5% by mass of the amorphous silica has a pH of 6 or higher, and
wherein the coating liquid comprises the amorphous silica in an amount of 3% by mass to 20% by mass.

2. The printing medium of claim 1, wherein the amorphous silica has an average particle diameter of 2 μm to 7 μm.

3. The printing medium of claim 1, wherein 82% of particles of the kaolin have a particle diameter of 2 μm or less.

4. The printing medium of claim 1, wherein 92% of particles of the kaolin have a particle diameter of 2 μm or less.

5. The printing medium of claim 1, wherein 96% of particles of the kaolin have a particle diameter of 2 μm or less.

6. The printing medium of claim 1, having a basis weight of 50 g/m² to 250 g/m².

7. A method of inkjet recording, comprising:
printing an image on a printing medium with an ink which comprises a fluorine surfactant and has a surface tension of 15 mN/m to 30 mN/m;
wherein the printing medium comprises base paper and a coating layer; and
wherein the coating layer is directly formed on the base paper by a cast coating method with a coating liquid,
wherein the coating liquid comprises kaolin and amorphous silica, wherein the amorphous silica is such that a dispersion having 5% by mass of the amorphous silica has a pH of 6 or higher, and
wherein the coating liquid comprises the amorphous silica in an amount of 3% by mass to 20% by mass.

8. The method of claim 7,
wherein the fluorine surfactant is of formula (1):

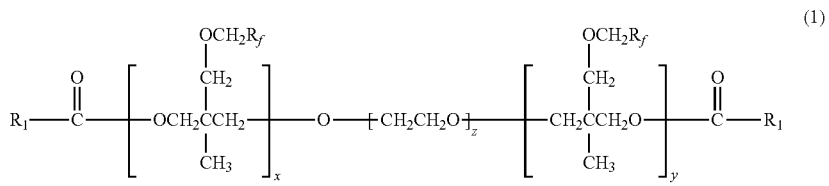

(1)

wherein
$R_1$ represents any one of a hydrogen atom, an alkyl group, and a fluorine comprising group,
$R_f$ represents a fluorine comprising group; and
x, y, and z each represent an integer.

9. The method of claim 8,
wherein the ink comprises a water dispersible resin.

10. A method of forming an image, the method comprising,
forming an image on a printing medium by using at least one selected from the group consisting of an offset printing method and an electrophotographic printing method in combination with an inkjet printing method,
wherein the printing medium comprises base paper and a coating layer, and
wherein the coating layer is directly formed on the base paper by a cast coating method with a coating liquid,
wherein the coating liquid comprises kaolin and amorphous silica, wherein the amorphous silica is such that a dispersion having 5% by mass of the amorphous silica has a pH of 6 or higher, and
wherein the coating liquid comprises the amorphous silica in an amount of 3% by mass to 20% by mass.

* * * * *